UNITED STATES PATENT OFFICE.

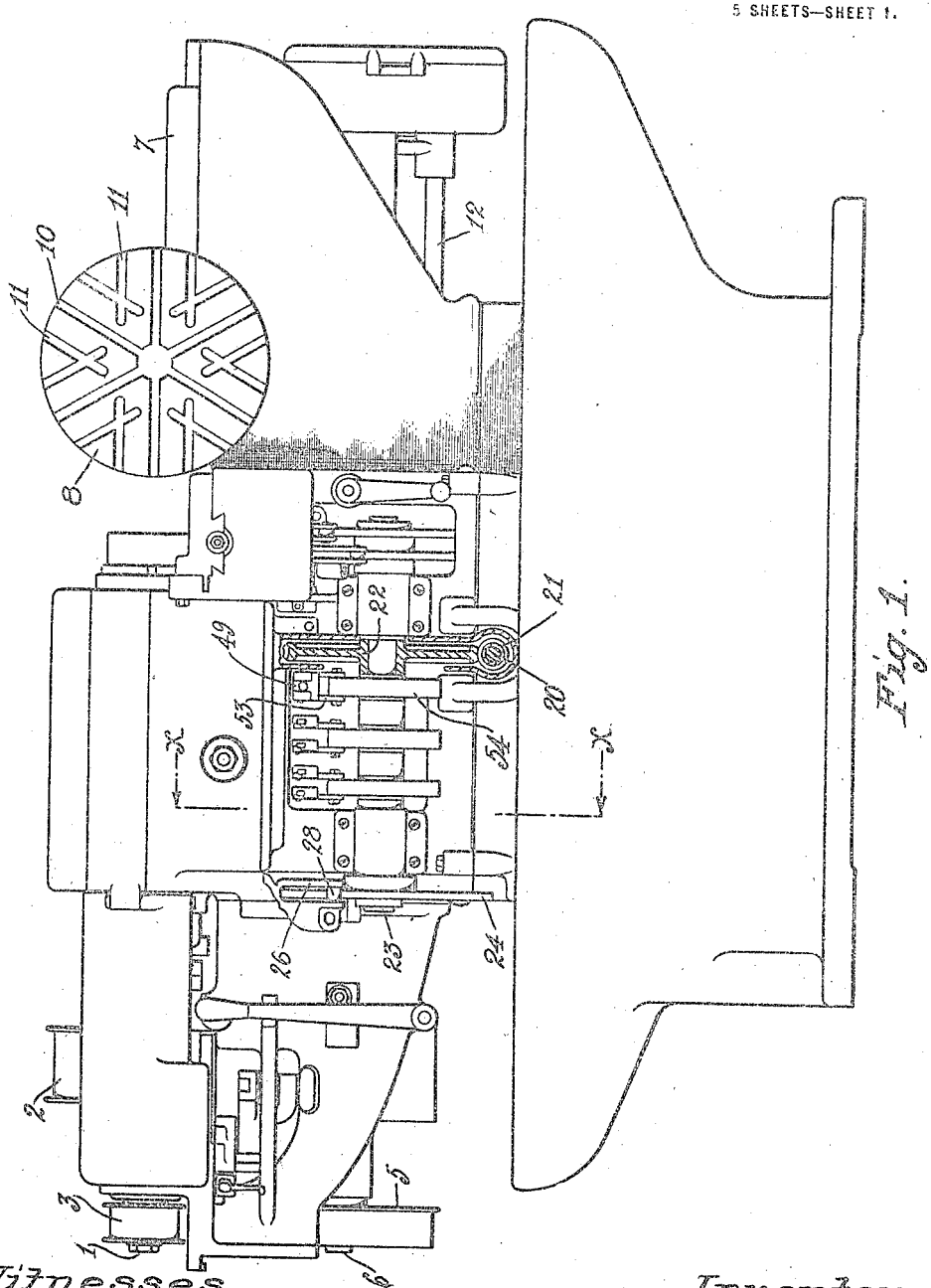

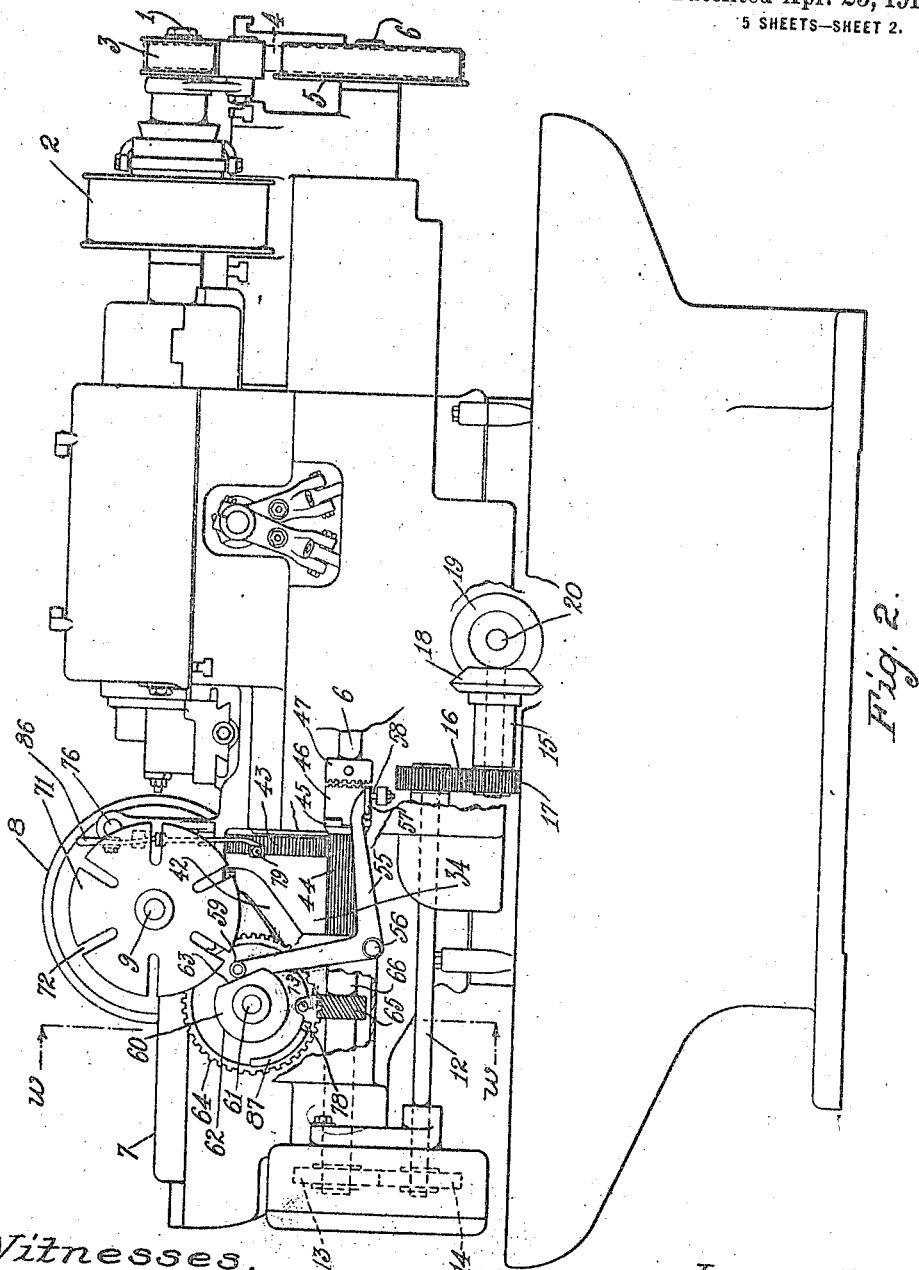

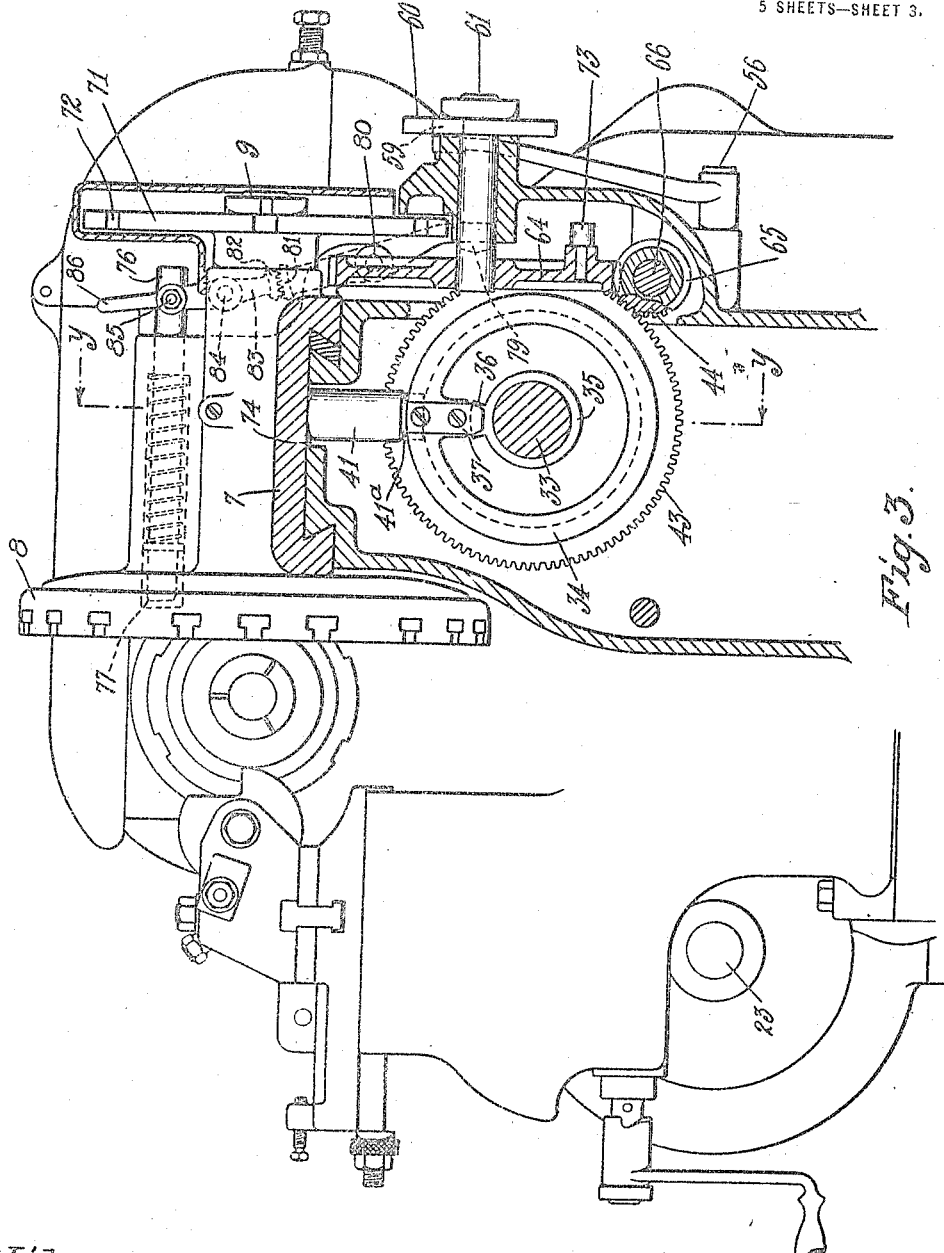

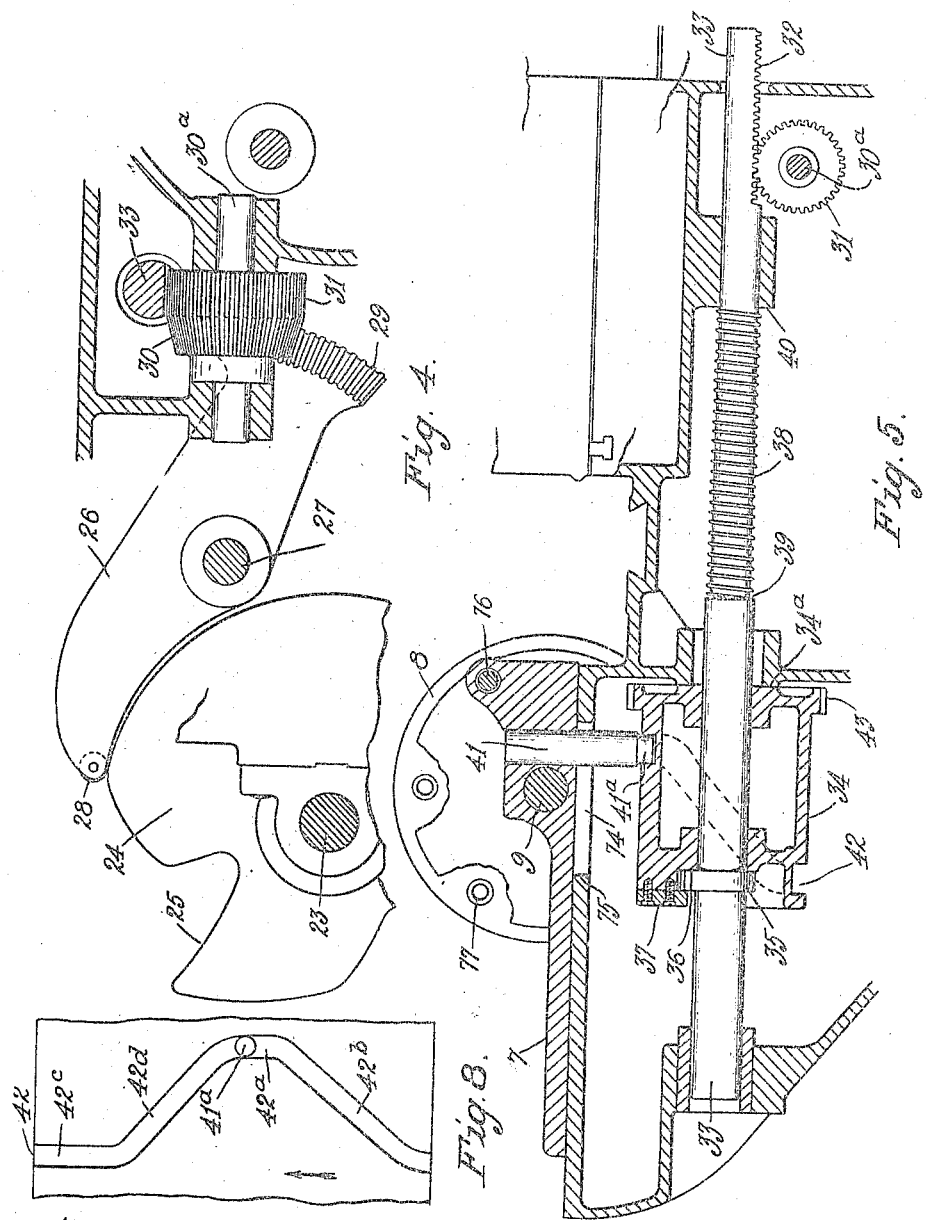

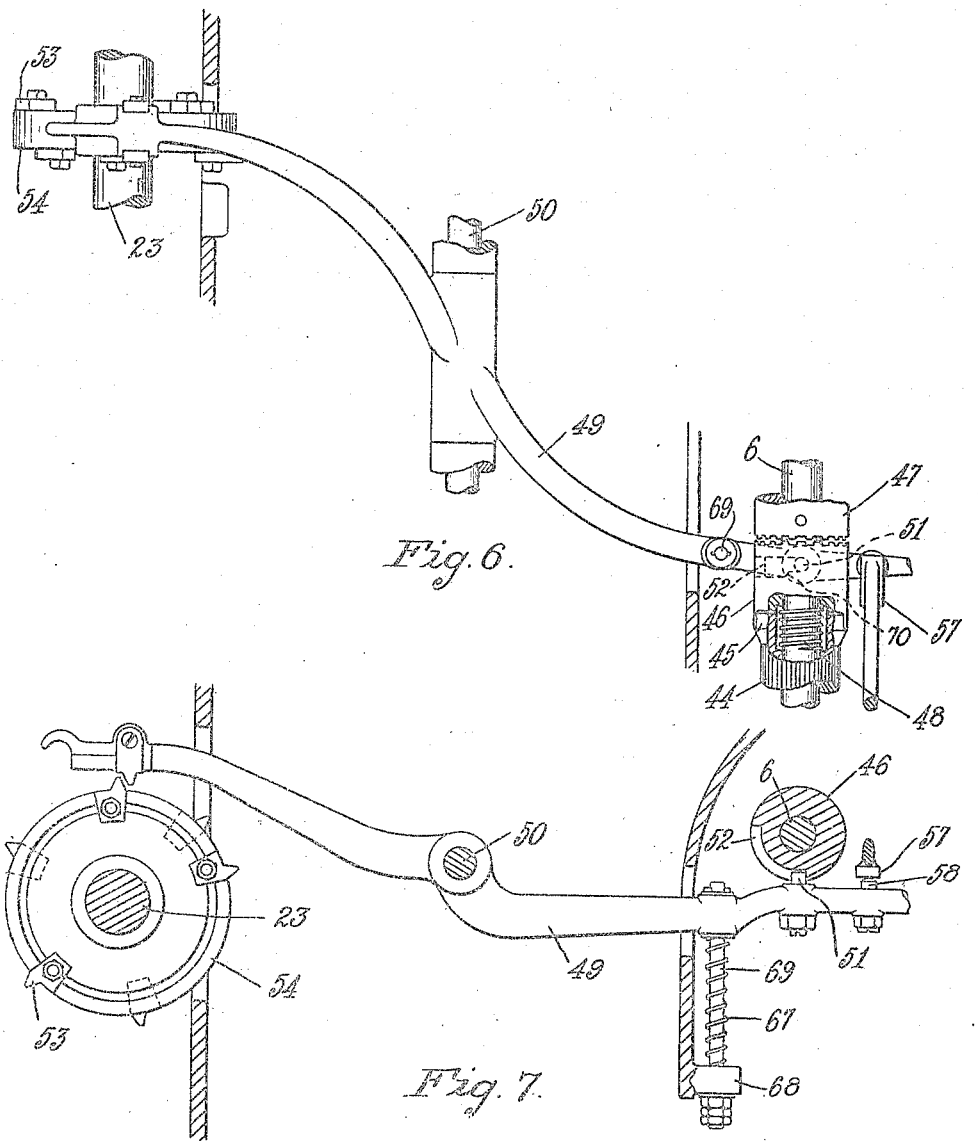

CHARLES A. RICH, OF PROVIDENCE, RHODE ISLAND, ASSIGNOR TO BROWN & SHARPE MANUFACTURING COMPANY, OF PROVIDENCE, RHODE ISLAND, A CORPORATION OF RHODE ISLAND.

SCREW-MACHINE.

1,180,429.  Specification of Letters Patent.  Patented Apr. 25, 1916.

Application filed March 8, 1915. Serial No. 12,750.

*To all whom it may concern:*

Be it known that I, CHARLES A. RICH, of the city and county of Providence and State of Rhode Island, have invented certain new and useful Improvements in Screw-Machines; and I do hereby declare the following specification, taken in connection with the accompanying drawings, forming a part of the same, to be a full, clear, and exact description thereof.

The present invention relates to screw machines, and more particularly to that class of screw machines in which a rod or stock is intermittently fed forward for the prescribed distance to form an article and is held by the jaws of a revolving chuck and successively acted upon by a series of tools carried by an indexing turret mounted on a turret slide.

One object of the present invention is to provide a novel construction and arrangement of turret and to so combine the same with other parts of the machine that certain advantageous results as hereinafter set forth may be obtained. In machines of this character it is desirable, as a matter of saving time and consequently of increasing the production, that means should be provided for giving a quick return movement to the turret-slide, that is, movement in the direction away from the work, and also for giving a quick advancing movement to bring the next tool up to the work, leaving practically only the movement of the turret-slide involved in the actual operation of the tool upon the work to be effected by slow operating feed mechanism.

Another object of the invention is to provide novel means for effecting such quick return and quick advancing movements of the turret-slide.

To these ends one feature of the invention consists in the employment of a flat face turret mounted to turn about a horizontal axis at right angles to the axis of the work-spindle, and preferably located at one side of the axis of said spindle.

The invention further consists in the combination, with the turret-slide, of a rotary member adapted to be moved lengthwise to impart a slow feeding movement to said turret-slide and also adapted to be rotated to impart to said turret-slide a quick return movement. As will be hereinafter explained, the rotation of said rotary member may also serve to impart to said turret-slide a quick advancing movement to bring the next tool up to the work.

The invention further consists in the combination, with the turret-slide and a lead-cam for imparting a slow feeding movement thereto, of a rotary member adapted to form a part of the operative connection between said lead-cam and said turret-slide and to be moved lengthwise by the action of said lead-cam, and also adapted to be rotated by mechanism independent of said lead-cam to impart a quick return movement to said turret-slide.

The invention further consists in the combination, with the turret-slide and a lead-cam for imparting a slow feeding movement thereto, of a longitudinally movable member, and a rotary member mounted on said longitudinally movable member and adapted to be connected thereto so as to be moved lengthwise therewith under the action of said lead-cam, and adapted to be disconnected from said longitudinally movable member so as to be free to be rotated thereon by mechanism independent of said lead-cam.

The invention further consists in the combination, with the turret-slide carrying a turret and mechanism for indexing said turret, of a rotary member adapted to be moved lengthwise to impart a slow feeding movement to said turret-slide and also adapted to be rotated to impart to said turret-slide a quick return movement, said rotary member being so constructed that the turret-slide will be caused to remain stationary while the turret is being indexed.

The invention further consists in the combination and arrangements of parts hereinafter described and claimed.

Referring to the drawings—Figure 1 is a front elevation of the machine. Fig. 2 is a rear elevation with parts of the frame broken away. Fig. 3 is a transverse section on an enlarged scale on the line $w$—$w$ of Fig. 2. Fig. 4 is a partial section on an enlarged scale on the line $x$—$x$ of Fig. 1. Fig. 5 is a section on the line $y$—$y$ of Fig. 3. Figs. 6 and 7 are plan and elevation details showing the clutch-tripping lever and coöperating parts. Fig. 8 is a development of the cam-slot in the cam-drum for actuating the turret-slide.

In the drawings the present features of invention are shown as applied to an automatic screw machine of the general character of the machine shown and described in Letters Patent to Davenport, No. 604,306, dated May 17, 1898, to which reference may be had, and in the drawings the spindle end of the machine is shown as similar to that shown and described in Letters Patent to applicant, No. 997,700, dated July 11, 1911, and the spindle end of the machine need therefore be only generally described, the present features of invention relating only to the turret end of the machine.

1 is the driving shaft to which is connected a single face pulley 2 for driving the same, said shaft being a constant speed shaft. Secured to the driving shaft 1 is a pulley 3 from which a belt 4 extends to a pulley 5 on a shaft 6 extending lengthwise of the machine, and which may be termed the operating shaft, and from which all of the several mechanisms are operated, except the rotation of the work spindle.

The turret slide 7 is mounted to slide in suitable ways and carries the turret 8, which is secured to a horizontal shaft 9 mounted in the turret slide, said turret being thus mounted to turn about a horizontal axis. The turret 8 is a flat turret and as shown is located at one side of the axis of the work-spindle. Said turret is provided on one vertical face with a series of radial T-slots 10, in which the several tools for operating upon the rod of stock carried by the work-spindle may be clamped. As shown in the drawings, a series of supplemental T-slots 11 are also formed in the face of the turret, which said slots 11, as shown, are arranged parallel to the main slots 10, and in which tools for operating on the work may also be clamped, as hereinafter described.

The mechanism for giving the desired reciprocating movements to the turret slide and turret will next be described, it being understood that the mechanism shown in the drawings for imparting such reciprocating movements to the turret-slide is adapted to impart a slow feeding movement to said turret-slide while the tool is operating upon the work, and then to give a quick return movement to said turret-slide and a quick advance of the turret-slide up to the work for the operation of the next tool thereon, the turret slide being held stationary at its rearward position while the turret is being indexed.

The shaft 6 is connected at one end to a parallel shaft 12 by a pair of change gears 13 and 14. Said shaft 12 is connected to another parallel shaft 15 by gears 16, 17. Said shaft 15 carries a bevel gear 18 which meshes with a bevel gear 19 on the transverse shaft 20. Said shaft 20 is provided with a worm 21 engaging a worm-wheel 22 secured to a shaft 23. Mounted on said shaft 23 is the lead-cam 24 provided with a series of lobes 25, one for each tool in the turret. As will be understood, the shape of these lobes will vary according to the work to be performed, two lobes of varying shape being shown in Fig. 4. A lever 26 pivoted at 27 is provided at one end with a roll 28 arranged to ride on the peripheral surface of the lead-cam, and at the other end with a segmental bevel gear 29 arranged to engage the bevel-gear 30 mounted loosely on a fixed stud 30$^a$ secured in the frame.

As shown in Fig. 1, the lever 26 is a forked lever arranged to straddle the lead-cam, with the roll 28 located between the forked ends of said lever. Secured to or formed integral with the bevel-gear 30 is a spur-gear 31 which engages rack-teeth 32 formed on a longitudinally movable member in the form of a bar 33. Mounted on said longitudinally movable bar 33 is a rotary member in the form of a cam-drum 34. Said cam-drum 34 is adapted to be connected to said bar 33 so as to be moved lengthwise therewith, and is also adapted to be disconnected from said bar 33, so that said cam-drum may be moved lengthwise on said bar. Said cam-drum 34 is also adapted to be rotated on the bar 33 by means to be hereinafter described.

Secured to the longitudinally movable bar 33 is a collar 35 provided with a projecting lug 36. Secured in a slot formed in the end of the cam-drum 34 is a narrow plate 37, the inner end of which is arranged to normally overlie the lug 36 as shown in Figs. 3 and 5. As shown in Fig. 5, the inner side of the lug 36 abuts against the end of the cam-drum 34.

With the parts in the position shown, the lug 36 extends between the end of the cam-drum and the overlying plate 37, thereby connecting the cam-drum with the longitudinally movable shaft 33, and so that said cam-drum will be moved longitudinally with said bar in either direction. Surrounding the bar 33 is a spring 38, one end of which abuts against a shoulder 39 formed on said bar, and the other end of which abuts against a lug 40 on the frame. Secured to the turret-slide 7 is a downwardly extending pin 41 carrying a roll 41$^a$ and adapted to enter a cam-slot 42 formed in the cam-drum 34.

With the construction above described the rotation of the lead-cam 24 will, through the connections described, serve to move the bar 33 to the right in Fig. 5, and thus in a direction to impart feeding movement to the turret-slide for the operation of one or the other of the tools in the turret upon the work. When longitudinal movement is imparted to the bar 33 by the rotation of the lead-cam, the cam-drum 34 will be moved lengthwise with said bar 33, and by reason of the engagement of the pin 41 with the cam-slot 42 in the cam-drum, the turret-slide will have correspondingly longitudinal movement imparted thereto. With the construction described, as will be seen, the cam-drum constitutes a part of the connection between the lead-cam and the turret-slide, whereby feeding movement is imparted to said turret-slide. The movement of the bar 33 under the action of the lead-cam serves to put the spring 38 under tension, and so that said spring 38 will, when permitted to do so, serve to move the turret-slide in the opposite direction under the control of the lead-cam.

The mechanism for imparting a quick return movement to the turret-slide and a quick advance of the same up to the work will next be described. Such quick return and advancing movements of the turret-slide are effected by the rotation of the cam-drum 34 on the bar 33 on which said cam-drum is mounted. The mechanism for imparting at the desired times rotation to said cam-drum is as follows: Secured to or formed integral with the cam-drum 34 is a gear 43 which meshes with an elongated pinion 44 loosely mounted on the shaft 6. Said pinion 44 is provided at one end with a clutch-member 45 which is always in engagement with a sliding clutch-member 46 likewise loosely mounted on the shaft 6, said sliding clutch-member 46 being adapted to be engaged with and disengaged from a clutch-member 47 secured to the shaft 6 and rotating therewith. A spring 48 is located within the clutch-member 45 with one end of the spring abutting against one end of the sliding clutch-member 46 and with its other end abutting against the bottom of a recess in the clutch-member 45, said spring tending to move the sliding clutch-member 46 into engagement with the clutch-member 47 when permitted to do so.

The mechanism for effecting or controlling the engagement or disengagement of the sliding clutch-member 46 with the clutch-member 47 is as follows:—Said sliding clutch-member 46 is normally held out of engagement with the clutch-member 47 by means of a latch lever 49 which extends across the machine and is pivoted on a rod 50. The rear end of the lever 49 is provided with a pin 51 adapted to enter a slot 52 formed in the sliding clutch-member 46, the parts being so constructed and arranged that when the pin 51 is in said slot in the clutch-member 46, said clutch-member will be held out of engagement with the clutch-member 47, as shown in Figs. 2 and 6. The operation of the latch-lever 49 to release the clutch-member 46 is controlled by tappets or tripping dogs 53 adjustably mounted, preferably in T-slots, on a disk 54 secured to the shaft 23. With this construction, as will be seen, whenever the front end of the lever 49 is raised by one of the tripping dogs 53 on the disk 54, the rear end of said lever will be depressed and the pin 51 will be withdrawn from the slot 52, so as to permit the sliding clutch-member 46 to be thrown by the action of the spring 48 into engagement with the clutch-member 47, and so that said clutch-member 46 and the clutch-member 45 connected thereto, and consequently the elongated pinion 44, will be rotated, thereby imparting rotative movement to the cam-drum 34. Said cam-drum 34 is to make one complete revolution while the clutch-member 46 is in engagement with the clutch-member 47. In the construction shown, the ratio of the gear 43 and the pinion 44 is such that said pinion 44 is to be given four revolutions for one revolution of the gear 43, and consequently the clutch-member 46 is to remain in engagement with the clutch-member 47 while said pinion 44 makes four revolutions, and means are provided for causing said clutch-member 46 to so remain in engagement with the clutch-member 47, which means are as follows: A bell-crank-lever 55 pivoted to the frame at 56 has one arm arranged to overlie the rear end of the latch-lever 49. Preferably this arm of said bell-crank lever 55 is provided with a flattened portion 57 adapted to engage the end of an adjusting screw 58 mounted in the end of said latch-lever 49, as shown in Fig. 7. The other arm of said bell-crank lever 55 carries a roll 59 adapted to ride upon the surface of a cam 60 secured to a shaft 61 mounted in suitable bearings in the frame or in a bracket secured to the frame. As shown in Fig. 2, the cam 60 comprises a concentric portion 62 and a flatted portion 63.

Secured to the shaft 61 is a spiral gear 64 which engages a spiral gear 65 secured to a sleeve 66 which is preferably formed integral with the elongated pinion 44, the construction being such that said spiral gear 65 will be rotated when the pinion 44 is rotated, and thereby serves to rotate the spiral gear 64 and the cam 60. With this construction the operation is as follows: With the roll 59 on the bell-crank lever 55 in engagement with the flatted portion 63 of the cam 60, the parts will be in the position shown in the drawings and with the pin 51 on the latch-lever 49 located in the slot 52 of the sliding clutch-member 46, as shown in Fig. 7. When now the pin 51 is withdrawn from the slot 52 in the clutch-member 46 by the action of one of the dogs 53 on the latch-lever 49, and said clutch-member thereby released to be thrown into engagement with the clutch-member 47 by the action of the spring 48, the spiral gear 65, as well as the elongated pinion 44, will be rotated, thereby rotating the cam 60. The rotation of said cam 60 will serve to move the flatted portion 63 from beneath the roll 59 on the bell-crank lever 55 and bring the concentric portion 62 of the cam beneath said roll. In the construction shown the arrangement of the bell-crank-lever 55 is such, with the arm which is provided with the flattened portion 57 occupying substantially a horizontal position, that when the latch-lever 49 is moved to withdraw the pin 51 from the slot 52, said horizontal arm of the bell-crank-lever will fall down by its own weight, the flattened portion 57 following the adjusting screw 58 in its downward movement and thereby moving the roll 59 to the right in Fig. 2 independent of the action of the cam 60. With this construction, so long as the concentric portion 62 of the cam 60 remains beneath the roll 59, the horizontal arm of the bell-crank-lever will be held in its lowered position, and will thus serve to hold the rear end of the latch-lever 49 in its lowered position, and consequently to hold the pin 51 out of the slot 52 in the clutch-member 46, thereby causing said clutch-member to remain in engagement with the clutch-member 47, and so that the pinion 44 and the spiral gear 65 will continue to be rotated so long as the concentric portion 62 on the cam 60 remains beneath the roll 59. When said flatted portion 63 is brought beneath the roll 59, the bell-crank lever 55, and consequently the latch-lever 49, will be thereby released, and so as to permit said latch-lever to be returned to its normal position by the action of a spring 67. Said spring 67 has one end bearing against the underside of the latch-lever 49 and the other end bearing against the lug 68 projecting from the frame. Preferably a guiding-rod 69 secured to the lug 68 and extending through the spring 67, and also extending loosely through the latch-lever 49, is employed for guiding said spring in its movements.

As above stated, with the construction shown, the pinion 44 and the gear 65 are to make four revolutions for one revolution of the gear 43 and the gear 64. Means are therefore provided for disengaging the clutch-member 46 from the clutch-member 47 when said clutch-member and consequently the pinion 44 and the gear 65 have made four revolutions. Such means consists of a cam surface 70 formed on the wall of the slot 52 in the clutch-member 46, which cam-surface, as the clutch-member 46 revolves, will, when the latch-lever 49 is released by the action of the cam 60 as above described, come in contact with the pin 51 on said latch-lever, and so that the continued rotation of said clutch-member 46 will cause it to be withdrawn from engagement with the clutch-member 47, thereby discontinuing the rotation of the pinion 44 and the gear 65. As will be understood, the cam 60 is so formed that the flatted portion 63 will be brought beneath the roll 59, and the latch-lever 49 thereby released after the clutch-member 46 has made three revolutions, and so that the cam-surface 70 will engage and be acted upon by the pin 51, so as to disengage the clutch 46 as it completes its fourth revolution.

The mechanism for indexing the turret 8 is as follows: A disk 71 connected with the turret, preferably by being secured to the shaft 9, is provided with radial slots 72 arranged to be engaged by a crank-pin 73 carried by the spiral gear 64, as shown in Fig. 2. As heretofore explained, the spiral gear 64 is intermittently revolved through the spiral gear 65 by the engagement of the sliding clutch-member 46 with the clutch member 47, said spiral gear 64 being given one complete revolution during the engagement of said clutch. At the same time the cam-drum 34 is rotated through the pinion 44 and the gear 43 to give the quick return movement to the turret-slide.

It is desirable that the turret-slide shall always be brought back to the same position for the indexing of the turret, and also that the turret-slide shall remain stationary during the indexing operation. For this purpose the cam-slot 42 in the cam-drum 34 is provided with a straight portion 42°. When in the rotation of the cam-drum the roll 41ª is caused to enter said straight portion 42° of the cam-slot and the action of the cam-drum in effecting the quick return movement of the turret-slide is thereby terminated, the axis of the turret will be brought substantially in vertical alinement with the axis of the spiral gear 64. As the cam-drum is at this time disconnected from the longitudinally movable bar 33, and is thus free to move lengthwise thereon, it is preferred to also provide a positive stop for limiting the rearward movement of the turret-slide by the quick return mechanism referred to, in order to insure that the turret-slide will not be carried by momentum beyond the proper position for the indexing of the turret. For this purpose the frame is provided with an elongated slot 74 through which the pin 41 extends, as shown in Fig. 5. The rear wall 75 of this slot serves as a fixed stop with which the pin 41 comes into engagement to positively limit the rearward movement of the turret-slide.

The parts are so timed that when the axis of the turret has been brought into vertical alinement with the axis of the spiral gear 64 and the turret thus brought to the proper position for indexing, the crank-pin 73 will have been brought to a position where it will enter and engage one of the slots 72 in the disk 71, and so that the continued rotation of said spiral gear will serve to turn the turret a partial revolution and to move the same from one indexed position to the next. The slots 72 in the disk 71 are so arranged that the crank-pin will enter and leave said slots while moving radially of the disk 71, and the turret will thus be gradually started and stopped, and may be indexed quickly without any jar either in starting or stopping. Moreover, with this construction of indexing mechanism, the turret may remain locked until the crank-pin enters a slot 72 and may be again locked just before the crank-pin leaves the slot, and thus accuracy of indexing may be insured, since the turret is positively held at all times.

The turret is locked in indexed position by a spring-pressed locking bolt 76, which engages one or the other of a series of recesses 77 formed in said turret. The locking-bolt 76 is withdrawn just after the crank-pin 73 enters one of the slots 72 and released just before said crank-pin leaves said slot by means of a cam 78 secured to one face of the spiral-gear 64, as shown in Fig. 2. Said cam 78, as the spiral-gear 64 is rotated, is adapted to be brought into engagement with the lower end of a lever 79, pivoted at 80 on the turret-slide, when said turret-slide has been moved back to indexing position. Said lever 79 is provided at its upper end with a segment gear 81 adapted to engage a segment gear 82 at the lower end of a second lever 83 pivoted at 84 on the turret-slide. Said lever 83 carries at its upper end a pin 85 adapted to enter a slot formed in the outer end of the locking bolt 76. Preferably said lever 83 is provided with a handle 86 for operating the locking bolt by hand when desired.

The locking bolt 76, when withdrawn from the recess in the turret, is to be held so withdrawn during the indexing of the turret, and for this purpose the cam 78 is provided with an extension 87 upon which the lower end of the lever 79 rides until the indexing of the turret has been completed. When the lower end of said lever rides off of the end of said extension 87, the locking bolt will be projected by the action of its spring into the next recess in the turret and the turret thereby again locked.

With the construction above described, the operation is as follows:—Assuming the parts to be in the position shown in Figs. 2, 4 and 5, being the position which they occupy when the forward feeding movement of the turret-slide under the action of the lead-cam has been completed, the forward end of the cam-drum 34 will have been brought into engagement with the fixed part of the frame $34^a$, as shown in Fig. 5. Just as such feeding movement of the turret-slide is completed, the clutch 46 will be tripped and released by the action of one of the tripping dogs 53 on the trip-lever 49, whereby rotating movement will be imparted to the pinion 44 and to the cam-drum 34. The first effect of so rotating said cam-drum will be to carry the plate 37 thereon past and out of line with the lug 36, thereby disconnecting said cam-drum from the longitudinally movable bar 33. During this movement of the cam-drum the roll $41^a$ travels in the straight portion $42^a$ of the cam-slot 42, and so that during such movement there is no tendency to move either the cam-drum or the turret-slide lengthwise. The roll $41^a$ now enters the inclined portion $42^b$ of the cam-slot 42, and as the cam-drum, when disconnected from the bar 33, will be prevented by its engagement with the frame from moving to the right in Fig. 5, the effective action of said inclined portion $42^b$ will be, through the engagement of the roll $41^a$ therewith, to move the turret-slide backward and thus to impart a quick return movement to said turret-slide. The roll $41^a$ now enters the straight portion $42^c$ of the cam-slot, and so that the turret-slide will, notwithstanding that the cam-drum continues to rotate, remain stationary during the indexing of the turret as above described. The roll $41^a$ now enters the oppositely inclined portion $42^d$ of the cam-slot and the continued rotation of the cam-drum serves to give a quick advancing movement to the turret-slide to bring the next tool up to the work.

During the forward feeding movement of the turret-slide under the action of the lead-cam 24, the roll 28 will be brought to the top of one of the lobes 25 and thus to a position where, in the further rotation of the lead-cam, the roll 28 will begin to drop down the next drop in said lead-cam. With the roll 28 in this position, the clutch-member 46 is shifted to start the rotation of the cam-drum 34. The first rotary movement of the cam-drum serves to disconnect the lugs 36 and 37 and thus to unlock the cam-drum from the bar 33, and the continued rotation of the cam-drum serves to effect the quick return movement of the turret-slide as above described. During the rotation of the cam-drum the roll 28 drops down the next drop in the lead-cam, thus freeing the bar 33, which will thereupon be moved to the left in Fig. 5 under the action of the spring 38. During the quick return movement of the turret-slide the end of the cam-drum is held against the stop-wall $34^a$ of the frame, and being disconnected from the bar 33 the cam-drum is not moved to the left with said bar, but remains in engagement with said stop-wall. Consequently the collar 35, which is secured to the bar 33, is moved away from the left-hand end of the cam-drum. When now, in the rotation of the cam-drum, after the indexing has been completed, the roll $41^a$ enters the inclined portion $42^d$ of the cam-slot 42, the first effect, owing to the fact that the weight of the turret-slide and the parts carried thereby is much greater than the weight of the cam-drum, will be to cause the cam-drum to be moved to the left until the left-hand end of the cam-drum is brought into engagement with the collar 35. Said collar 35 thereupon serves to constitute an abutment for the cam-drum, and so that the further rotation of the cam-drum will serve to produce a quick advancing movement of the turret-slide.

The movement of the cam-drum to the left and into engagement with the collar 35 as above described serves to move the right-hand end of the cam-drum a corresponding distance away from the stop-wall 34ª, and so that when the quick advancing movement of the turret-slide is completed, there will be a space between the right-hand end of the cam-drum and the stop-wall 34ª equal to the distance the bar 33 has been moved to the left by the action of the spring 38 under the control of the drop of the lead-cam, which distance will equal the extent of the next forward feeding movement of the turret-slide under the action of said lead-cam. As will be understood, at the time the quick advancing movement is completed, the roll 28 will have reached the bottom of the drop and will be in a position to ride up the next lobe of the lead-cam to effect the forward feeding movement of the turret-slide.

Just as the roll 41ª passes out of the inclined portion 42ᵈ and into the straight portion 42ª of the cam-slot, the clutch 46 is disengaged by the action of the cam-surface 70 with the pin 51 on the trip-lever, thereby stopping the rotation of the cam-drum. While the roll 41ª is passing along the last part of the inclined portion 42ᵈ or the straight portion 42ª, the plate 37 on the cam-drum will be carried over, and into line with, the lug 36, thereby again connecting the cam-drum to the bar 33.

When the clutch 46 is tripped and thrown into engagement to start the rotation of the cam-drum, as above described, the spiral gear 64 will also be rotated so as to bring the crank-pin 73 into engagement with one of the slots 72, and at the same time to withdraw the locking bolt 76, the continued rotation of said spiral gear serving to index the turret, as above described, the turret being again locked at the end of such indexing movement.

When the rod of stock is to be operated upon by a closed die for the purpose of cutting a screw-thread thereon the operation is somewhat modified, by reason of the fact that in such case the die is to be run off from the work before the quick return mechanism operates. In such case the backward movement of the turret-slide for thus running the die off of the work is effected by the spring 38 under the control of the lead-cam, the proper tripping dog 53 in such case being so adjusted that the clutch 46 will not be tripped and released until the die has been so run off of the work. In thus moving the turret-slide backward by the action of the spring 38 under the control of the lead-cam, the cam-drum 34, being at this time connected to the bar 33, constitutes, as will be seen, a part of the connection between said bar 33 and the turret-slide, and consequently the cam-drum will be moved lengthwise with said bar 33, and so as to move the forward end of said cam-drum away from the fixed part of the frame against which it at this time normally abuts. When now the clutch 46 is tripped and the cam-drum thereby rotated, by reason of the fact that the weight of the turret-slide and of the parts mounted thereon is much greater than the weight of the cam-drum, the first effect of the rotation of said cam-drum after said cam-drum has been disconnected from the bar 33, and when the roll 41ª begins to travel through the inclined portion 42ᵇ of the cam-slot, will be to move the cam-drum to the right in Fig. 5, instead of to move the turret-slide to the left. The cam-drum will continue to be so moved to the right until the forward end of the cam-drum is brought into engagement with the abutment 34ª on the frame, whereby the movement of the cam-drum to the right will be arrested, and so that the further travel of the roll 41ª through the inclined portion 42ᵇ will serve to move the turret-slide to the left, and thus impart a quick return movement to the turret-slide through the remaining distance to bring the turret into indexing position. In this case, however, the quick advancing movement of the turret to bring the next tool up to the work will be effected by the rotation of the cam-drum and by the travel of the roll 41ª through the inclined portion 42ᵈ as before.

With the construction shown and described, as will be seen, means are provided for effecting a quick return movement of the turret slide and a quick advancing movement of said slide to bring the tool up to the work, such mechanism embodying a cam-drum which is rotated for the purpose of producing such quick movements of the turret slide. As will be further seen, said cam-drum performs two functions, viz., the function of serving as a part of the connection between the lead-cam and the turret-slide for the slow feeding movement of said turret slide, and the function of imparting by the rotation of said cam-drum quick return and advancing movements to said turret-slide.

As hereinbefore stated, the turret is a flat turret arranged to turn about a horizontal axis at right angles to the axis of the work-spindle, said turret being located at one side of the axis of the work-spindle and being constructed to hold the operating tools upon one of the flat vertical faces of the turret. Several advantages result from this construction and arrangement of the turret.

By reason of the fact that the turret is a flat turret with the tools mounted on the face of said turret, a wide range of adjustment of the tools in the turret is provided for, while by reason of the fact that the turret is mounted to turn about a horizontal axis at right angles to the axis of the work-spindle, the turret may be moved up between the two cross-slides of the machine without adjacent tools in the turret coming in contact with the cross-slides, and without the cross-slides interfering with any desired forward movement of the turret to bring the operating tool in between the cross-slides.

With such construction and arrangement of the turret, the turret is located wholly at one side of the work and a clear way is thus provided for the pieces of work as they are cut off and for the chips to pass entirely clear of the turret. Not only this, but there is also a clear way for the rod of stock itself, and so that, if the tools in line with said stock be omitted, the stock can pass clear by the turret, or, if there be a tool at the far side of the turret, the stock can pass as far as that tool. Moreover, in the case of a hollow tool, the rod or stock may be passed to any desired distance through the tool without any interference by the turret itself.

In the formation of long pieces of work, it becomes desirable to feed the work forward after it has been operated upon by the tools in the turret and before the piece of work is cut off from the rod of stock. With the construction and arrangement of the truret shown and described, this can readily be done by reason of the fact that the work can pass by the turret. Moreover, with the turret so located, these long pieces of work, when so cut off, will fall clear of the turret, instead of lodging thereon as would be the case if the turret were otherwise arranged. Furthermore, with such construction and location of the turret, and with the operating mechanisms located as shown in the drawings, the frame at the turret end of the machine may be entirely cut away beyond the work-holding face of the turret, as indicated by the shading in Fig. 1, and so that there will be a clear passage for the pieces of work and the chips to fall into the trough of the machine below.

As shown in the drawings, the flat vertical face of the turret is provided not only with main tool-holding T-slots 10, but also with supplemental tool-holding T-slots 11 located one on each side of said main slot and parallel therewith. With this construction three tools may be held in the turret to operate upon the work in one and the same indexed position, one tool being held in one of the main slots, a second tool in one of the supplemental slots, and a third tool in the second supplemental slot, and so that all three of said tools may operate simultaneously upon the stock.

What I claim as my invention and desire to secure by Letters Patent is:

1. A screw machine having, in combination, a work-spindle, a turret-slide, and a flat face turret mounted on said turret-slide to turn about a horizontal axis at right angles to the axis of said work-spindle.

2. A screw machine having, in combination, a work-spindle, a turret-slide, and a flat face turret mounted on said turret-slide to turn about a horizontal axis at right angles to the axis of said work-spindle and located at one side of the axis of said spindle.

3. A screw machine having, in combination, a work-spindle, a turret-slide, and a flat face turret mounted on said turret-slide to turn about a horizontal axis at right angles to the axis of said work-spindle and located at one side of the axis of said spindle, the frame of the machine being cut away at one side of said turret whereby a clear way will be provided for the pieces of work when severed from the rod of stock to fall down past and to a position below said turret.

4. A screw machine having, in combination, a work-spindle, a turret-slide, and a flat face turret mounted on said turret-slide to turn about a horizontal axis, said turret being provided with a series of radial slots for holding the tools to be clamped therein.

5. A screw machine having, in combination, a work-spindle, a turret-slide, and a flat face turret mounted on said turret-slide to turn about a horizontal axis at right angles to the axis of said work-spindle, said turret being provided with a series of slots for holding the tools to be clamped therein.

6. A screw machine having, in combination, a work-spindle, a turret-slide, and a flat face turret mounted on said turret-slide to turn about a horizontal axis, said turret being provided with a series of radial slots in which tools may be clamped, and with a series of supplemental slots adjacent thereto in which additional tools may be clamped.

7. A screw machine having, in combination, a turret-slide, a rotary member, means for moving said rotary member lengthwise to impart movement to said turret-slide in one direction and means for moving said rotary member to impart to said turret-slide movement in the opposite direction.

8. A screw machine having, in combination, a turret-slide, a rotary member, means for moving said rotary member lengthwise to impart a feeding movement to said turret-slide and means for rotating said rotary member to impart to said turret-slide a quick return movement.

9. A screw machine having, in combination, a turret-slide, a lead-cam, and a rotary member forming a part of the operative connection between said lead-cam and said turret-slide.

10. A screw machine having, in combination, a turret-slide, a lead-cam, and a rotary member forming a part of the operative connection between said lead-cam and said turret-slide, said rotary member being adapted to be disconnected and to be independently rotated.

11. A screw machine having, in combination, a turret-slide, a lead-cam and a rotary member forming a part of the operative connection between said lead-cam and said turret-slide and adapted to be moved lengthwise by the action of said lead-cam.

12. A screw machine having, in combination, a turret-slide, a lead-cam, a rotary member forming a part of the operative connection between said lead-cam and said turret-slide, said rotary member being adapted to be moved lengthwise by the action of said lead-cam and being also adapted to be disconnected and to be independently rotated.

13. A screw machine having, in combination, a turret-slide, a lead-cam, a rotary member forming a part of the operative connection between said lead-cam and said turret-slide, means for disconnecting said rotary member, and means for rotating said rotary member when disconnected.

14. A screw machine having, in combination, a turret-slide, a lead-cam, a rotary member forming a part of the operative connection between said lead-cam and said turret-slide and adapted to be moved lengthwise by the action of said lead-cam, means for disconnecting said rotary member, and means for rotating said rotary member when disconnected.

15. A screw machine having, in combination, a turret-slide, a lead-cam, a rotary member forming a part of the operative connection between said lead-cam and said turret-slide and adapted to be moved lengthwise by the action of said lead-cam, means for disconnecting said rotary member, and means independent of said lead-cam for rotating said rotary member.

16. A screw machine having, in combination, a turret-slide, a longitudinally movable member for actuating said turret-slide, and a rotary member mounted on said longitudinally movable member and adapted to be connected thereto to be moved lengthwise therewith.

17. A screw machine having, in combination, a turret-slide, a longitudinally movable member for actuating said turret-slide, and a rotary member mounted on said longitudinally movable member, said rotary member being adapted to be connected to said longitudinally movable member so as to be moved lengthwise therewith and to be disconnected therefrom so as to be free to rotate thereon.

18. A screw machine having, in combination, a turret-slide, a longitudinally movable member for actuating said turret-slide, a rotary member mounted on said longitudinally movable member, means for connecting said rotary member to said longitudinally movable member so as to be moved lengthwise therewith, and for disconnecting said rotary member therefrom.

19. A screw machine having, in combination, a turret-slide, a longitudinally movable member for actuating said turret-slide, a rotary member mounted on said longitudinally movable member, and means for rotating said rotary member on said longitudinally movable member.

20. A screw machine having, in combination, a turret-slide, a longitudinally movable member for actuating said turret-slide, a rotary member mounted on said longitudinally movable member, and means operated by the rotation of said rotary member for connecting said rotary member to said longitudinally movable member and disconnecting it therefrom.

21. A screw machine having, in combination, a turret-slide, a longitudinally movable member for actuating said turret-slide, a rotary member mounted on said longitudinally movable member, means for connecting said rotary member to said longitudinally movable member to be moved lengthwise therewith, and means operated by the rotation of said rotary member for disconnecting said rotary member from said longitudinally movable member.

22. A screw machine having, in combination, a turret-slide, a longitudinally movable member for actuating said turret-slide, a rotary member mounted on said longitudinally movable member, and projections on said longitudinally movable member and said rotary member respectively adapted to be brought into and out of line with each other by the rotation of said rotary member.

23. A screw machine having, in combination, a turret-slide carrying a turret, a rotary member adapted to be moved lengthwise to impart movement to said turret-slide in one direction and adapted to be rotated to impart to said turret-slide movement in the opposite direction, and means for indexing said turret.

24. A screw machine having, in combination, a turret-slide carrying a turret, a rotary member adapted to be moved lengthwise to impart movement to said turret-slide in one direction and adapted to be rotated to impart to said turret-slide movement in the opposite direction, means for indexing said turret, and means for causing said turret-slide to remain stationary while said turret is being indexed.

25. A screw machine having, in combination, a turret-slide carrying a turret, a rotary member, means for moving said rotary member lengthwise to impart movement to said turret-slide in one direction, means for rotating said rotary member to impart to said turret-slide movement in the opposite direction, and means operating in conjunction with said rotating means for indexing said turret.

26. A screw machine having, in combination, a turret-slide carrying a turret, a rotary member, means for moving said rotary member lengthwise to impart movement to said turret-slide in one direction, means for rotating said rotary member to impart to said turret-slide movement in the opposite direction and to bring said turret-slide to indexing position, means for indexing said turret, and means for causing said turret-slide to remain in indexing position while said turret is being indexed.

27. A screw machine having, in combination, a turret-slide carrying a turret, a rotary member, means for moving said rotary member lengthwise to impart movement to said turret-slide in one direction, means for rotating said rotary member to impart to said turret-slide movement in the opposite direction and to bring said slide to indexing position, means operating in conjunction with said rotating means for indexing said turret, and means for causing said turret-slide to remain in indexing position while said turret is being indexed.

28. A screw machine having, in combination, a turret-slide, a longitudinally movable member, a rotary member adapted to be connected to said longitudinally movable member to move said turret-slide toward the work, and adapted to be disconnected from said longitudinally movable member and to be rotated, said rotary member being provided with a cam-groove formed to move said turret-slide away from the work when said rotary member is rotated.

29. A screw machine having, in combination, a turret-slide, a longitudinally movable member, a rotary member adapted to be connected to said longitudinally movable member to move said turret-slide toward the work, and adapted to be disconnected from said longitudinally movable member and to be rotated, said rotary member being provided with a cam-groove formed to first effect said disconnection and then to move said turret-slide away from the work.

30. A screw machine having, in combination, a turret-slide carrying a turret, a longitudinally movable member, a rotary member adapted to be connected to said longitudinally movable member to move said turret-slide toward the work, and adapted to be disconnected from said longitudinally movable member and to be rotated, said rotary member being provided with a cam-groove formed to first effect said disconnection, then to move said turret-slide away from the work and to indexing position, and then to cause said turret-slide to remain stationary for the indexing of said turret.

31. A screw machine having, in combination, a turret-slide carrying a turret, a longitudinally movable member, a rotary member adapted to be connected to said longitudinally movable member to move said turret-slide toward the work and adapted to be disconnected from said longitudinally movable member and to be rotated, said rotary member being provided with a cam-groove formed to first effect said disconnection, then to move said turret-slide away from the work and to indexing position, then to cause said turret-slide to remain stationary for the indexing of said turret, and then to move said turret-slide toward the work.

32. A screw machine having, in combination, a turret-slide, a rotary member, means for moving said rotary member lengthwise to impart movement to said turret-slide in one direction, means for rotating said rotary member to impart to said turret-slide movement in the opposite direction, and a clutch for controlling the operation of said rotating means.

33. A screw machine having, in combination, a turret-slide, a rotary member, means for moving said rotary member lengthwise to impart movement to said turret-slide in one direction, means for rotating said rotary member to impart to said turret-slide movement in the opposite direction, a clutch for controlling the operation of said rotating means, and means for controlling the throwing in and out of said clutch.

34. A screw machine having, in combination, a turret-slide carrying a turret, a rotary member, means for moving said rotary member lengthwise to impart movement to said turret-slide in one direction, means for rotating said rotary member to impart to said turret-slide movement in the opposite direction, means for indexing said turret, and a clutch for controlling the operation of said rotating means and said indexing means.

35. A screw machine having, in combination, a turret-slide carrying a turret, a rotary member, means for moving said rotary member lengthwise to impart movement to said turret-slide in one direction, means for rotating said rotary member to impart to said turret-slide movement in the opposite direction, means for indexing said turret, a clutch for controlling the operation of said rotating means and said indexing means and means for controlling the throwing in and out of said clutch.

36. A screw machine having, in combination, a turret-slide, a rotary member, means for moving said rotary member lengthwise to impart movement to said turret-slide in one direction, means for rotating said rotary member to impart to said turret-slide movement in the opposite direction, a clutch for controlling the operation of said rotating means, and means for causing said clutch to remain in engagement for more than one revolution thereof.

CHARLES A. RICH.

Witnesses:
W. H. THURSTON,
J. H. THURSTON.